United States Patent

[11] 3,578,814

| [72] | Inventor | Percy E. Todd |
| | | Apison, Tenn. |
| [21] | Appl. No. | 756,820 |
| [22] | Filed | Sept. 3, 1968 |
| [45] | Patented | May 18, 1971 |
| [73] | Assignee | Percy Todd Manufacturing Company |
| | | Cleveland, Tenn. |

[54] METHOD AND APPARATUS FOR CONVEYING DUST
5 Claims, 3 Drawing Figs.

[52] U.S. Cl. .................................................. 302/40, 302/53, 302/55
[51] Int. Cl. ....................................................... B65g 53/40
[50] Field of Search .......................................... 302/40, 41, 48, 49, 55, 64, 53, 52

[56] References Cited
UNITED STATES PATENTS

| 2,261,347 | 11/1941 | DiSanto et al. ............... | 302/64 |
| 2,391,484 | 12/1945 | Seymour ....................... | 302/64 |
| 2,477,414 | 7/1949 | McBride ....................... | 302/49 |
| 2,819,122 | 1/1958 | Schneider ..................... | 302/55 |
| 3,352,605 | 11/1967 | McCandless .................. | 302/55 |
| 1,935,843 | 11/1933 | Goebels ........................ | 302/53 |
| 2,124,018 | 7/1938 | Vogel-Jorgensen ........... | 302/53 |
| 2,221,741 | 11/1940 | Vogel-Jorgensen ........... | 302/53 |
| 2,668,085 | 2/1954 | Baresch ........................ | 302/53 |
| 2,678,240 | 5/1954 | Snow ............................ | 302/53 |

Primary Examiner—Andres H. Nielsen
Attorney—Jones & Thomas

ABSTRACT: A method and apparatus for conveying particulate material from a silo to a container in which material is transferred to a surge container that is substantially at atmospheric pressure, pressurized fluid is then directed into the surge container to entrain the particulate material and convey it along the path, the path having a trap to assure that the particulate material is conveyed by the fluid.

PATENTED MAY 18 1971 3,578,814

INVENTOR
Percy E. Todd
BY Jones & Thomas
ATTORNEYS

METHOD AND APPARATUS FOR CONVEYING DUST

BACKGROUND OF THE INVENTION

1. Field of the Invention

This invention relates to pneumatic delivery systems, and is more particularly concerned with an improved apparatus and method of conveying particulate material, or dust.

2. Description of the Prior Art

Various forms of dust are frequently stored in a silo or the like from which they are dispensed to smaller bins or equipment for transportation or for use. One important application of such is the mixing of asphalt in which the asphalt is mixed with a quantity of dust. Since the material has such a small particle size, bucket conveyors and comparable mechanical equipment are impractical for use in transporting the material even over short distances.

The common solution to this problem is to use pneumatic means to transport dust. The dust is transported through a conduit by a stream of fluid.

Previous pneumatic means have required either that the entire silo be pressurized to move the dust from the silo and along a conduit, or that fluid be continuously passed through a conduit into which the dust is dispensed.

When the entire silo is pressurized it will be obvious that an especially designed silo must be used in order to withstand the pressure required to force the dust from the silo and through the conduit. Also, when the pressure is applied to the dust, even a small amount of moisture will cause the dust to cake into a solid mass so that it cannot flow from the silo.

One of the most severe disadvantages of pressurizing the entire silo is that, in order to load the silo with dust, the pressure must be removed, the dust loaded into the silo, and the pressure again built up. This entails a considerable amount of downtime which is very expensive since no dust is available while the silo is inoperable.

In the systems in which dust is fed into a continuously moving stream of fluid, a large amount of pressurized fluid is required, which requires a large-capacity compressor. Also, there will be a large volume of fluid in the conduit entraining only a small percentage of dust. This requires a long time to deliver a given amount of dust; and, it is difficult to determine how much dust has been delivered due to the quantity of fluid entraining the dust.

In addition, the dust tends to form small lumps or pellets, and these lumps or pellets will cause jamming to prevent the flow of dust.

Asphalt is normally mixed in batches of a given size, which requires dust in batches of a given size; and, in mixing asphalt, it is important to receive the dust at a critical time and dispense the completed mix at a critical time. Therefore, if the required amount of dust be delivered over a long period of time, the entire process is disturbed. This, also, makes it undesirable to receive the dust entrained in a great quantity of fluid.

In many batch-type asphalt plants, the dust will be delivered to a weigh-hopper, and the weigh-hopper will dispense the preweighed batch of dust into a pug mill. A large percentage of dust will make accurate weighing very difficult.

BRIEF DESCRIPTION OF THE INVENTION

The apparatus and method of the present invention overcome the above-mentioned and other difficulties inherent in the prior art devices by providing a batch conveying system in which dust is taken from the silo as a batch, then either a desired portion of that batch or the entire batch can be conveyed by fluid with the material conveyed comprising a large percentage of dust and a very small percentage of fluid.

In general terms the present invention includes a surge container below the silo in selective communication with the silo through a gate. A source of pressurized fluid is connected to the surge container to pressurize the system, and a delivery conduit is connected to the surge container for delivery of the material.

In operation, the gate is opened to allow a quantity of dust to pass into the surge container, and the gate is closed to seal the surge container. Fluid under pressure is then admitted to the surge container to urge the dust from the surge container and through the delivery conduit. Any time the source of pressurized fluid is cut off from the surge container, the delivery of dust will terminate so that any portion of the dust that is in the surge container can be delivered. Also, the delivery conduit may have a valve at the delivery end so that the flow can be controlled either by turning off the source of pressurized fluid or by closing off the delivery conduit.

These and other features and advantages of the present invention will become apparent from consideration of the following specification when taken in conjunction with the accompanying drawings in which:

DESCRIPTION OF AN EMBODIMENT

Figure 1:
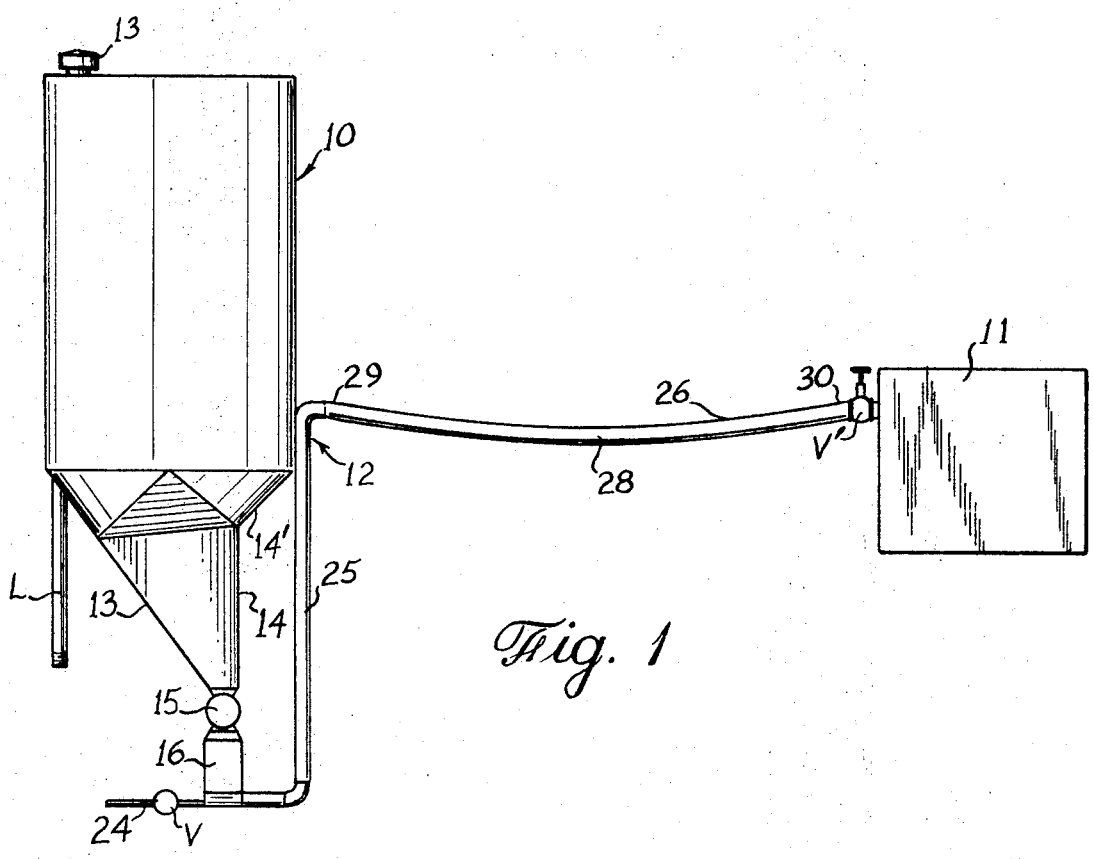
FIG. 1 is a side elevational view showing a delivery system embodying the present invention.

Referring now more particularly to the drawings and to that embodiment of the invention here chosen by way of illustration, the apparatus of FIG. 1 includes a silo 10, in which dust is stored, adjacent to a bin 11, to which the dust is to be transferred from the silo 10. The bin 11 may be a pug mill for asphalt, or it may be a weigh-hopper to feed batches of dust to a pug mill, or other container to which dust is to be transferred.

The lower end of the silo 10 is tapered to provide a small opening through which dust can pass through the gate and into the surge container. Though such apparatus frequently has a uniform taper on all sides forming a pyramid, many forms of dust will bridge the outlet and prevent further flow. To prevent the bridging, the present silo is formed with one tapering side 13 while the opposite side 14 is substantially vertical. A short connecting wall 14' extends between the vertical wall 14 and the wall of the silo proper. With this arrangement, the discharge end of the silo 10 is asymmetrical so that it will not sustain a bridge of the dust.

At the lower end of the silo 10, there is a gate 15, and below the gate 15 there is a surge container 16.

The primary purpose of the gate 15 is to selectively cut off the silo 10 from the surge container 16 to control the flow of dust from the silo and to prevent the flow of pressurized fluid into the silo; however, the gate 15 may be combined with a feeding means by use of an airlock valve. Such devices are well known in the art and include generally a plurality of vanes 18 that are rotatable within a housing 19. Material is received between two of the vanes 18, the vanes are rotated, and the material falls from between the vanes into the container below. Meanwhile, at least two opposed vanes 18 ride against the housing 19 to assure that the opening through the housing 19 is sealed against free passage of material in either direction. One such device is disclosed in the U.S. Pat. No. 3,151,784 issued to John P. Tailer, though it will be recognized by those skilled in the art that numerous airlock valves will work quite satisfactorily, and a normal gravity-feed of the material will be sufficient for some forms of material.

Figure 2:
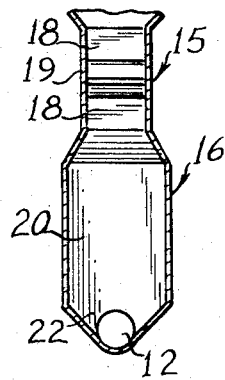
FIG. 2 is an enlarged vertical cross-sectional view showing the sealing means and surge container of the apparatus of FIG. 1; and, FIG. 3 is a vertical cross-sectional view taken at right angles with respect to FIG. 2.
Figure 3:
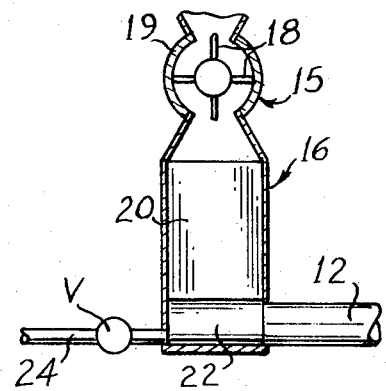

The surge container 16, as best shown in FIGS. 2 and 3, includes a substantially rectangular box 20 having converging sides to form a V-shaped discharge section 22. One end of the discharge section 22 is connected to the delivery conduit 12 while the opposite end of the delivery section 22 is connected, through a valve V, to a hose 24 that leads to a source of pressurized fluid (not shown).

Referring to FIG. 1 of the drawings, it will be seen that the delivery conduit 12 is connected to the discharge section 22 of the surge container 16, and has a vertical portion 25 that rises approximately to the elevation necessary to enter the pug mill or bin 11. Though the vertical portion 25 of the conduit 12 may be of rigid pipe if desired, it is preferable that the transverse portion 26 be of rubber or other flexible material to provide more easily for a trap 28.

If the transverse portion be very nearly straight and horizontal, there is a tendency for the dust to settle to the lower side of the conduit while the pressurized fluid flows through the upper portion of the conduit. To avoid this, the transverse portion 26 is allowed to dip to provide the trap 28. With the trap 28, if the dust settles, it will build up in the trap to block the conduit, and the fluid will once again entrain the dust.

It is of course possible to make the transverse portion 26 of rigid material and to bend the conduit into a fixed trap 28; however, it is less expensive and much simpler to use a flexible material and suspend the two ends 29 and 30 from the silo 10 and bin 11 respectively. The conduit 12 will assume the normal catenarian configuration to provide a sufficient trap 28.

OPERATION

In operation of the device it will be understood that dust is stored within the silo 10 and normally flows down into the lower portion. The dust cannot flow into the surge container until the gate 15 is opened.

When a given quantity of dust is to be delivered from the silo 10 to the bin 11, the gate 15 is operated to allow the proper quantity of dust to fall into the surge container 16 and the gate 15 is closed to seal the silo 10 from the surge container 16. Since the surge container 16 is at atmospheric pressure, there will be the downward flow of dust with no interference due to pressure differentials.

Once the desired amount of dust is in the surge container 16, the valve V can be opened to pressurize the surge container 16. If the valve V' on the bin 11 be open, the dust will be immediately forced through the delivery conduit 12 and into the bin 11. If the valve v' on the bin 11 is closed, the entire system will be pressurized, and the dust will be delivered when the valve V' is opened.

Thus, the control of dust flow can be exercised from either end of the delivery conduit 12. The valve V' on the bin 11 can start or stop the flow as long as the system is pressurized, and the flow can be started or stopped by opening or closing the valve V to apply or remove the pressure in the system.

Since there will be a large volume of dust within the surge container 16 when the system is pressurized, a minimum of fluid will be necessary to entrain the dust, so the material passing through the conduit 12 will comprise a very large portion of dust in the fluid, thus facilitating separation of the two and determination of the amount of dust received.

One mode of operation envisioned is to place the quantity of dust into the surge container that is required for one batch of asphalt, and to deliver the entire amount, which will require only a very few seconds. Optionally, a larger quantity of dust can be placed into the surge container 16, and discrete portion of the total quantity can be delivered as required by the pug mill.

When the surge container has been emptied, the valve V will be closed, and the pressure within the container 16 will return to atmospheric pressure. The apparatus is then ready to receive another batch of dust.

Since it is not necessary to pressurize the silo 10, a loading pipe L can be provided so that dust can be loaded into the silo 10 without interrupting the normal operation of the silo. An air vent 13 may be provided to allow the silo 10 to remain substantially at atmospheric pressure regardless of dust removed from or placed into the silo.

It will therefore be seen that the apparatus and method of the present invention provide an efficient and flexible system to deliver dust or other particulate material through a conduit without entraining a small quantity of material in a large quantity of fluid. Determination of amount delivered is easier, and a given volume can be delivered within a short time.

It will of course be understood by those skilled in the art that the embodiment of the invention here chosen is by way of illustration only and is meant to be in no way restrictive; therefore, numerous changes and modifications may be made, and the full use of equivalents resorted to, without departing from the scope of the invention as defined by the appended claims.

I claim:

1. A method of conveying particulate material through a delivery conduit from a storage silo to a bin, including the steps of maintaining the silo at generally atmospheric pressure, transferring a quantity of said particulate material from said storage silo to a surge container at a generally atmospheric pressure, until said surge container is substantially filled with the particulate material, sealing the surge container from the storage silo, and charging the surge container with gas under pressure by flowing gas into the lower portion of the surge container, generally across the lower portion of the surge container and out of the lower portion of the surge container into the delivery conduit to urge the particulate matter into and along the conduit.

2. The method according to claim 1 and in which the quantity of particulate material transferred to the surge container is allowed to become substantially stationary before the charging of the surge container.

3. The method according to claim 1 and further including the step of dissipating the gas under pressure from the surge container through the delivery conduit when the quantity of particulate material has been discharged from the surge container.

4. The method according to claim 1 and including the step of flowing the quantity of particulate material through a gas flow trap in the delivery conduit.

5. A method of conveying dry particulate material through a delivery conduit comprising flowing the material from a storage silo into a surge container below the storage silo, sealing the surge container from the storage silo, charging the surge container with a flow of air directed across the bottom of the surge container toward the delivery conduit until substantially all of the particulate material has been discharged from the surge container through the delivery conduit, terminating the airflow to the surge container, dissipating the air pressure from the surge container through the delivery conduit until the air pressure in the surge container is generally the same as the air pressure in the storage silo, and flowing the particulate material through a flow trap in the delivery conduit.